United States Patent
Kanou

(10) Patent No.: US 6,678,231 B2
(45) Date of Patent: Jan. 13, 2004

(54) DISC READING CONTROL APPARATUS, METHOD THEREOF AND COMPUTER PROGRAM PRODUCT FOR CONTROLLING DISC READING

(75) Inventor: Jun Kanou, Tokyo (JP)

(73) Assignee: NEC Corporation, Tokyo (JP)

( * ) Notice: Subject to any disclaimer, the term of this patent is extended or adjusted under 35 U.S.C. 154(b) by 221 days.

(21) Appl. No.: 09/987,926

(22) Filed: Nov. 16, 2001

(65) Prior Publication Data

US 2002/0060966 A1 May 23, 2002

(30) Foreign Application Priority Data

Nov. 17, 2000 (JP) ........................................ 2000-350854

(51) Int. Cl.[7] ................................................ G11B 7/00
(52) U.S. Cl. ................. 369/53.25; 369/47.1; 369/47.36
(58) Field of Search ............................. 369/47.1, 47.15, 369/47.28, 47.36, 47.48, 47.49, 53.1, 53.25, 59.1

(56) References Cited

U.S. PATENT DOCUMENTS 5,475,666 A * 12/1995 Ito et al. .................. 369/47.52
6,009,067 A * 12/1999 Hayashi .................... 369/47.26

FOREIGN PATENT DOCUMENTS

JP         11-134776         5/1999

* cited by examiner

Primary Examiner—Muhammad Edun
(74) Attorney, Agent, or Firm—Young & Thompson

(57) ABSTRACT

A disc reading control apparatus 10 comprises operation information inputting unit 12 for inputting information concerning a data getting operation A and a searching operation B in a data reading operation with respect to a disc recording medium; operation ratio determining unit 14 for determining the ratio of the searching operation B to the data getting operation A on the basis of the information inputted from the operation information inputting unit 12; and rotational speed setting unit 16 for setting the rotational speed C of the disc recording medium lower if the foregoing ratio of the searching operation determined by the operation ratio determining unit 14 is greater than a predetermined value.

13 Claims, 4 Drawing Sheets

DISC READING CONTROL APPARATUS, METHOD THEREOF AND COMPUTER PROGRAM PRODUCT FOR CONTROLLING DISC READING

BACKGROUND OF THE INVENTION

1. Field of the Invention

Present invention is used for a disc reading apparatus such as an optical disc apparatus or the like, and relates to a disc reading control apparatus for controlling the rotational speed of a disc recording medium.

2. Description of the Related Art

FIG. 4 is a block diagram showing a conventional disc reading apparatus, which will be described below with reference to this figure.

The conventional disc reading apparatus comprises a disc 1 as a disc recording medium; a read head 2 opposed to the recording surface of the disc 1 for getting information from that recording surface; a signal processing unit 3 for processing a read signal outputted from the read head 2 to read data; a microcomputer 4' for outputting a setting information, such as a reading speed, a rotational speed or the like, based on the read data, while determining the position of the read head 2 to output a setting information for shifting the read head 2 to the next read position; a servo controller 5 for outputting, based on the setting information from the microcomputer 4', control signals for controlling the rotation of the disc 1 and the shift of the read head 2; a spindle motor 6 controlled in rotation by an output from the servo controller 5 for providing the rotation of the disc 1; and a thread motor 7 controlled in shift by an output from the servo controller 5 for shifting the read head 2. For example, the disc 1 is an optical disc, while the read head 2 is an optical head.

The operation of the conventional disc reading apparatus during a disc reading will now be described below.

At first, during the disc reading, the microcomputer 4' causes the servo controller 5 to set the rotational speed to its maximum. At this moment, the disc 1 rotates at an upper limit of the rotational speed, and the read head 2 reads information from the recording surface of the disc 1 and applies the read information to the signal processing unit 3. The data processed by the signal processing unit 3 is inputted to the microcomputer 4'.

Subsequently, the microcomputer 4' decides, on the basis of the thus read data, whether or not a searching operation is necessary so as to get a next data. If the searching operation is necessary, the microcomputer 4' sets the servo controller 5 to the searching operation, which shifts the read head 2. Since no data can be got during the shift of the read head 2, the data getting from the read head 2 through the signal processing unit 3 is resumed after the termination of the shift of the read head 2.

As can be seen from the above, the conventional disc reading apparatus performs the data getting and searching operations with the maximum speed having been set.

As long as a difficult situation, such as a reading difficulty, does not occur, the conventional disc reading apparatus does not change the rotational speed of the disc recording medium during the reading operation. However, as the reading speed has been more enhanced in recent years, there has been less time to effect a pull-in of a servo control when the shift of the read head during the searching operation or the like frequently occurs. As a result, the disc reading temporarily cannot be performed, or at the worst, the servo control is lost.

THE SUMMARY OF THE INVENTION

It is an object of the present invention to provide a disc reading control apparatus and method that can effect a stable searching operation with no degradation of the reading capability, while realizing an enhancement of the disc reading speed or of the rotational speed, by use of a relatively simple structure.

A disc reading control apparatus according to the present invention comprises operation information inputting means for inputting information concerning data getting and searching operations in a data reading operation with respect to a disc recording medium; operation ratio determining means for determining the ratio of the searching operation to the data getting operation on the basis of the information inputted from the operation information inputting means; and rotational speed setting means for setting the rotational speed of the disc recording medium lower if the foregoing ratio of the searching operation determined by the operation ratio determining means is greater than a predetermined value. A disc reading control method according to the present invention is used for the disc reading control apparatus according to the present invention.

A large ratio of the searching operation to the data getting operation during the reading operation means that the shift of the read head frequently occurs. If this condition is left as it is, it results in no sufficient time being left to perform a pull-in of the servo control after shifting the read head. Then, it is proposed that the rotational speed of the disc recording medium be set lower so as to perform a stable servo control after shifting the read head. It should be appreciated that in this application, the meaning of a phrase, "if the ratio of the searching operation to the data getting operation is greater than a predetermined value, the rotational speed of the disc recording medium is set lower", is equal to the meaning of a phrase, "if the ratio of the searching operation to the data getting operation is smaller than a predetermined value, the rotational speed of the disc recording medium is set higher".

Besides, there may be additionally provided rotational speed limiting means for placing upper and lower limits on the rotational speed set by the rotational speed setting means. The operation information inputting means may input, as the information concerning the data getting and searching operations, the number of times of or the time period of the data getting operation and the number of times of or the time period of the searching operation. Moreover, as the foregoing ratio of the searching operation determined by the operation ratio determining means becomes greater, the rotational speed setting means may set the rotational speed of the disc recording medium variably or stepwise lower. Furthermore, the rotational speed setting means may set the rotational speed gradually lower.

In other words, the present invention is characterized in that when the searching operation frequently occurs during the disc reading, the rotational speed of the disc is variably or stepwise reduced. That is, the percentage of occurrence of the searching operation within a time period during the disc reading is determined, and if the determined percentage of the searching operation is large, the rotational speed is gradually reduced to a predetermined value; if the determined percentage of the searching operation is small, the rotational speed is gradually raised to a predetermined value. In this way, the reading speed is kept high during a continuous reading, while, when the searching operation frequently occurs, the rotational speed is reduced to such a degree that there is a sufficient time to perform a servo pull-in, thereby realizing a stable disc reading.

DETAILED DESCRIPTION OF THE PREFERRED EMBODIMENTS

Figure 1:
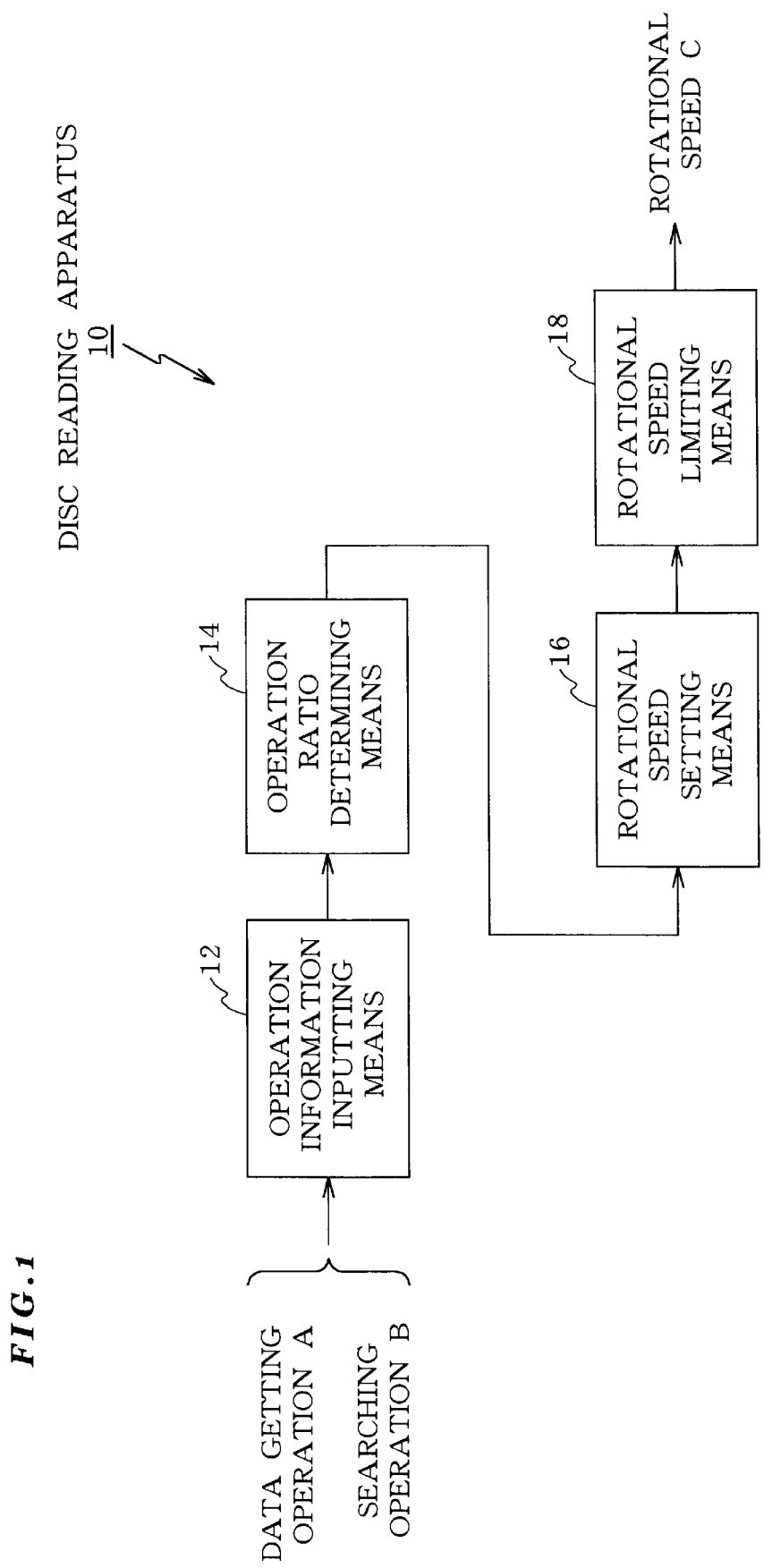
FIG. 1 is a block diagram showing an embodiment of the disc reading control apparatus according to the present invention.

FIG. 1 is a block diagram showing an embodiment of the disc reading control apparatus according to the present invention. This embodiment will be described below with reference to this figure.

A disc reading control apparatus 10 of this embodiment comprises an operation information inputting means 12 for inputting information concerning a data getting operation A and a searching operation B in a data reading operation with respect to a disc recording medium (not shown) ; an operation ratio determining means 14 for determining the ratio of the searching operation B to the data getting operation A on the basis of the information inputted from the operation information inputting means 12; and a rotational speed setting means 16 for setting the rotational speed C of the disc recording medium lower if the foregoing ratio of the searching operation determined by the operation ratio determining means 14 is greater than a predetermined value.

There is also provided a rotational speed limiting means 18 for placing upper and lower limits on the rotational speed C set by the rotational speed setting means 16. The operation information inputting means 12 inputs, as the information concerning the data getting and searching operations A and B, for example, the number of times of or the time period of the data getting operation A and the number of times of or the time period of the searching operation B. As the foregoing ratio of the searching operation B determined by the operation ratio determining means 14 becomes greater, the rotational speed setting means 16 may set the rotational speed C of the disc recording medium variably or stepwise lower. Furthermore, the rotational speed setting means 16 may set the rotational speed gradually lower.

When the ratio of the searching operation B becomes greater during the reading operation, the rotational speed C of the disc recording medium is set lower. As a result, there is a sufficient time left to perform a pull-in of the servo control after shifting the read head (not show), and hence a stable reading operation can be obtained.

Figure 2:
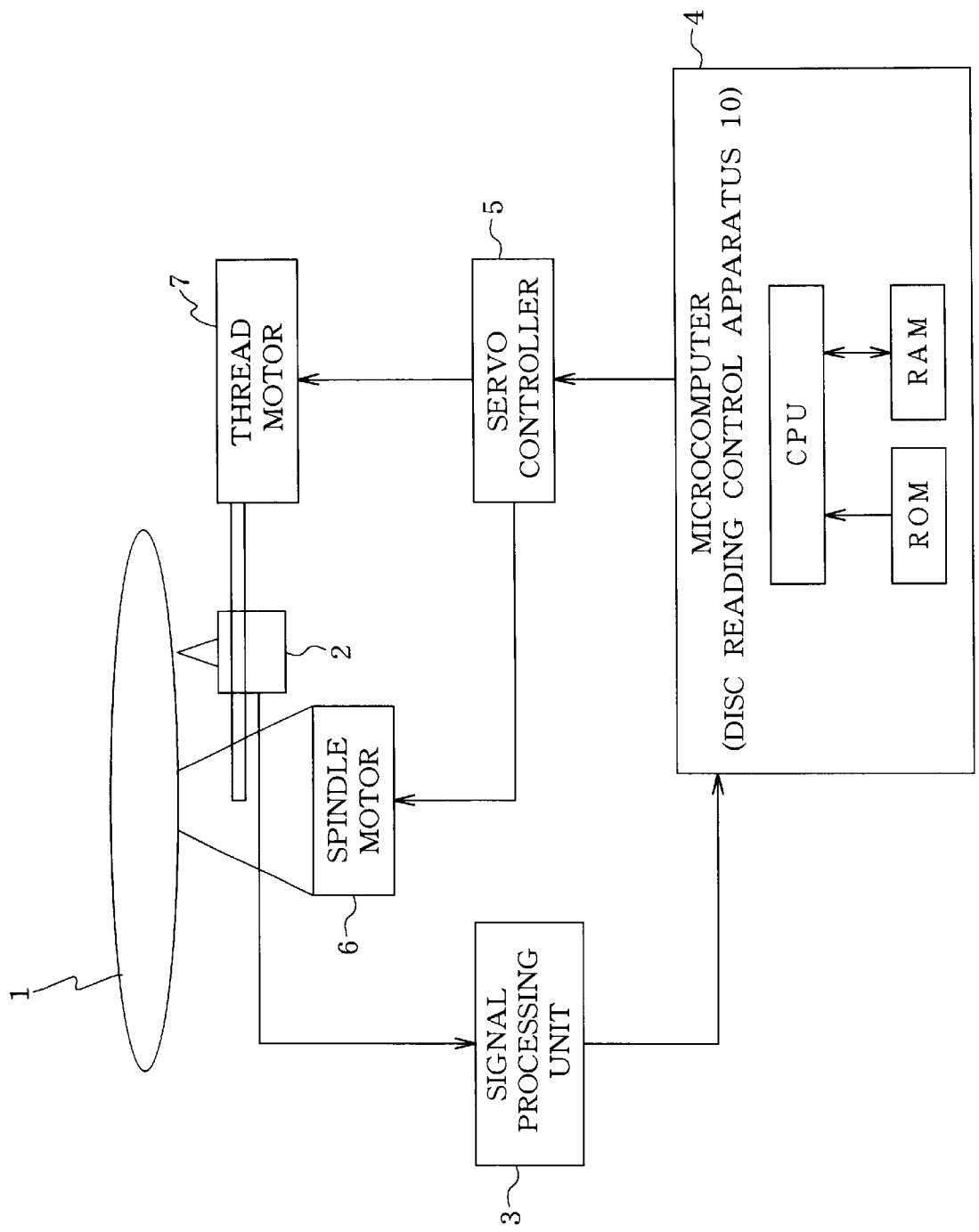
FIG. 2 is a block diagram showing a disc reading apparatus incorporating the disc reading control apparatus of FIG. 1.

FIG. 2 is a block diagram showing a disc reading apparatus incorporating the disc reading control apparatus 10. The following description will be made based on this figure.

The disc reading apparatus incorporating the disc reading control apparatus 10 comprises a disc 1 as a disc recording medium; a read head 2 opposed to the recording surface of the disc 1 for getting information from that recording surface; a signal processing unit 3 for processing a read signal outputted from the read head 2 to read data; a microcomputer 4 for outputting a setting information, such as a reproduction speed, a rotational speed or the like, based on the read data, while determining the position of the read head 2 to output a setting information for shifting the read head 2 to the next read position; a servo controller 5 for outputting, based on the setting information from the microcomputer 4, control signals for controlling the rotation of the disc 1 and the shift of the read head 2; a spindle motor 6 controlled in rotation by an output from the servo controller 5 for providing the rotation of the disc 1; and a thread motor 7 controlled in shift by an output from the servo controller 5 for shifting the read head 2. For example, the disc 1 is an optical disc, while the read head 2 is an optical head. The disc reading control apparatus 10 is realized, as one function of the microcomputer 4, by a computer program product.

The computer program product is stored in the microcomputer 4. The microcomputer 4 comprising of a central processing unit (herein after "CPU"), read only memory (herein after "ROM") and random access memory (herein after "RAM"), and the computer program product is stored in the ROM. The program is loaded from the ROM to the CPU and the RAM for performing as the disc reading control apparatus 10.

Here, the computer program product for processing method for controlling disc reading, the method comprising steps of: inputting information concerning data getting and searching operations in a data reading operation with respect to a disc recording medium; determining the ratio of the searching operation to the data getting operation on the basis of said information; and setting the rotational speed of said disc recording medium lower if said ratio is greater than a predetermined value.

Figure 3:
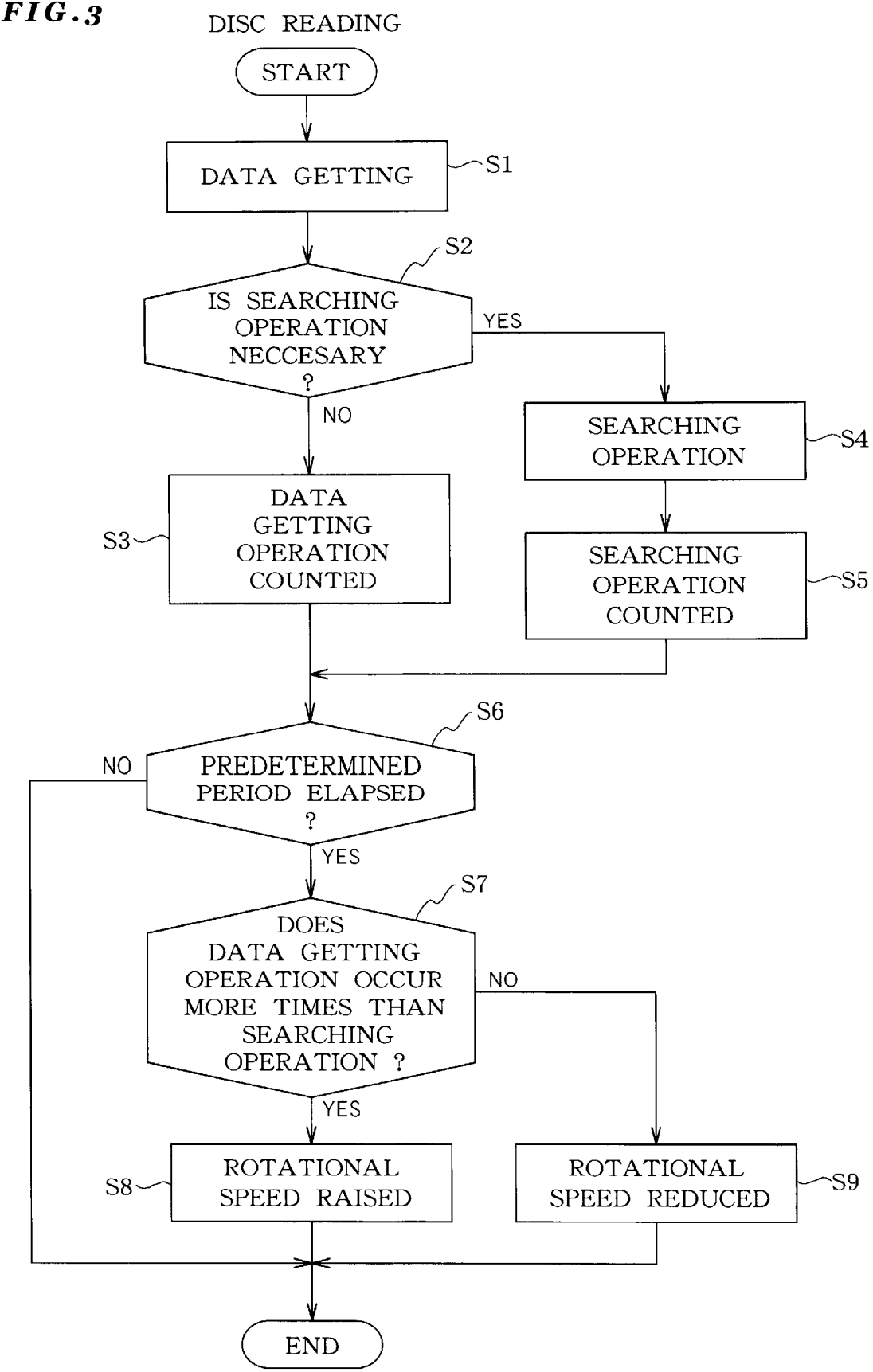
FIG. 3 is a flowchart showing the operation of the disc reading control apparatus of FIG. 1.
Figure 4:
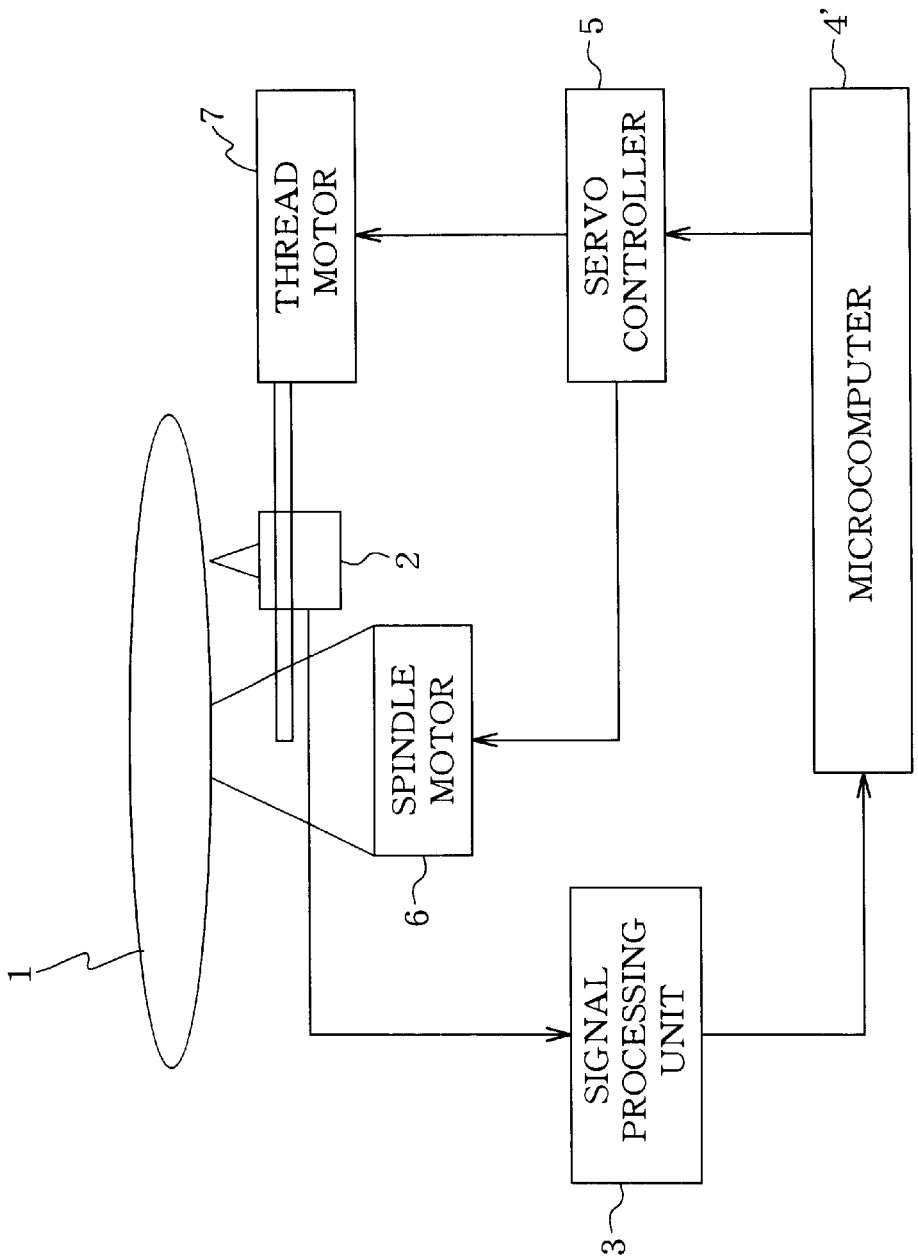
FIG. 4 is a block diagram showing a conventional disc reading apparatus.

FIG. 3 is a flowchart showing the operation of the disc reading control apparatus 10, which will be described below based on FIGS. 1–3.

The operation during changing the disc reading speed or the disc rotational speed will be effected as follows. At first, the microcomputer 4 sets the servo controller 5 to the maximum of the rotational speed. At this moment, the disc 1 rotates at the upper limit of the rotational speed, while the information on the recording surface of the disc 1 is read by the read head 2, and then processed by the signal processing unit 3, the processed data from which is then inputted to the microcomputer 4 (step S1).

Subsequently, the microcomputer 4 decides, based on the thus got data, whether or not a searching operation is necessary so as to read the next data (step S2). If the searching operation is necessary, the microcomputer 4 sets the servo controller 5 to the searching operation, which shifts the read head 2 (step S4). Since no data can be got during the shift of the read head 2, the data getting from the read head 2 through the signal processing unit 3 is resumed after the termination of the shift of the read head 2. The searching operation, after being performed, is counted (step S5). On the other hand, if the searching operation is not necessary in the foregoing step S2, then it is counted as a data getting operation (step S3).

Subsequently, the microcomputer 4 uses a timer provided therein to detect, at predetermined time intervals, whether the current operation is the data getting operation or the searching operation (steps S1 through S6). After performing this detection a predetermined number of times, the microcomputer 4 determines which occurs more times, the data getting operation or the searching operation (step S7). If the searching operation occurs more times than the data getting operation, the microcomputer 4 regards it as an over-searching condition and generates an instruction for reducing the rotational speed of the disc 1 (step S9). On the other hand, if the searching operation occurs less times than the data getting operation, the microcomputer 4 regards it as a data getting condition and generates an instruction for raising the rotational speed of the disc 1 (step S8).

When an instruction for changing the rotational speed of the disc 1 is generated, the currently set rotational speed is ascertained. If that instruction is for raising the rotational speed, the ascertained current rotational speed is checked against the upper limit of the rotational speed. If the current rotational speed has reached the upper rotational-speed limit, then no change is made to the rotational speed; otherwise, the rotational speed is set higher by one step. On the other hand, if the foregoing instruction is for reducing the rotational speed, the ascertained current rotational speed is checked against the lower limit of the rational speed. If the current rotational speed has reached the lower rotational-speed limit, then no change is made to the rotational speed; otherwise, the rotational speed is set lower by one step.

Thus, if the searching operation occurs more times during the reading operation, the disc reading apparatus incorporating the disc reading control apparatus 10 gradually reduces the rotational speed to a predetermined value. On the other hand, if the searching operation occurs less times during the reading operation, the disc reading apparatus gradually raises the rotational speed to a predetermined value.

The operations of the operation information inputting means 12 correspond to the steps S1 through S5. Those of the operation ratio determining means 14 correspond to the steps S6 and S7. Those of the rotational speed setting means 16 correspond to the steps S8 and S9.

According to the disc reading control apparatus and method of the present invention, the ratio of the searching operation to the data reading operation is determined based on information concerning the data getting and searching operations. If the determined ratio is greater than a predetermined value, then the rotational speed of the disc recording medium is set lower. In this way, even if the searching operation frequently occurs during the disc reading, the rotational speed of the disc recording medium is automatically reduced, with the result that the servo control after shifting the read head can be stabilized. Thus, while the enhancement of the disc reading speed or of the rotational speed is realized, a stable searching operation can be achieved.

In other words, according to the disc reading control apparatus and method of the present invention, if the searching operation occurs many times during the disc reading, the rotational speed is gradually reduced to a predetermined value; on the other hand, if the searching operation occurs few times during the disc reading, the rotational speed is gradually raised to a predetermined value. The amount of each raise or reduction in rotational speed can be set to any desired value. Therefore, when the searching operation frequently occurs, the rotational speed can be reduced to such a degree that the condition of the data getting is not affected. Thus, even in a case where the reading speed is enhanced, the searching operation can be performed with the rotational speed controlled such that there is a sufficient time left to effect a servo pull-in. As a result, the reading operation can be advantageously stabilized.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.2000-350854 (Filed on Nov. 17, 2000) including specification, claims, drawings and summary are incorporated herein by reference in its entirety.

What is claimed is:

1. A disc reading control apparatus comprising:

an operation information inputting means for inputting an information concerning data getting and searching operations in a data reading operation with respect to a disc recording medium;

an operation ratio determining means for determining the ratio of the searching operation to the data getting operation on the basis of the information inputted from said operation information inputting means; and a rotational speed setting means for setting the rotational speed of said disc recording medium lower if said ratio of the searching operation determined by said operation ratio determining means is greater than a predetermined value.

2. The disc reading control apparatus according to claim 1, further comprising a rotational speed limiting means for placing upper and lower limits on the rotational speed set by said rotational speed setting means.

3. The disc reading control apparatus according to claim 1, wherein said operation information inputting means inputs, as said information concerning the data getting and searching operations, the number of times of or the time period of said data getting operation and the number of times of or the time period of said searching operation.

4. The disc reading control apparatus according to claim 1, wherein as said ratio of the searching operation determined by said operation ratio determining means becomes greater, said rotational speed setting means sets the rotational speed of said disc recording medium variably lower.

5. The disc reading control apparatus according to claim 1, wherein as said ratio of the searching operation determined by said operation ratio determining means becomes greater, said rotational speed setting means sets the rotational speed of said disc recording medium stepwise lower.

6. The disc reading control apparatus according to claim 1, wherein said rotational speed setting means sets said rotational speed gradually lower.

7. A disc reading control method comprising:

inputting information concerning data getting and searching operations in a data reading operation with respect to a disc recording medium;

determining the ratio of the searching operation to the data getting operation on the basis of said information; and setting the rotational speed of said disc recording medium lower if said ratio is greater than a predetermined value.

8. The disc reading control method according to claim 7, wherein upper and lower limits are placed on the rotational speed.

9. The disc reading control method according to claim 7, wherein the number of times of or the time period of said data getting operation and the number of times of or the time period of said searching operation are inputted as said information concerning the data getting and searching operations.

10. The disc reading control method according to claim 7, wherein as the determined ratio of the searching operation to the data getting operation becomes greater, the rotational speed of said disc recording medium is set variably lower.

11. The disc reading control method according to claim 7, wherein as the determined ratio of the searching operation to the data getting operation becomes greater, the rotational speed of said disc recording medium is set stepwise lower.

12. The disc reading control method according to claim 7, wherein said rotational speed is set gradually lower.

13. A computer program product stored on a computer readable storage medium for processing method for controlling disc reading operation, said method comprising steps of:
- inputting information concerning data getting and searching operations in a data reading operation with respect to a disc recording medium;
- determining the ratio of the searching operation to the data getting operation on the basis of said information; and
- setting the rotational speed of said disc recording medium lower if said ratio is greater than a predetermined value.

* * * * *